UNITED STATES PATENT OFFICE.

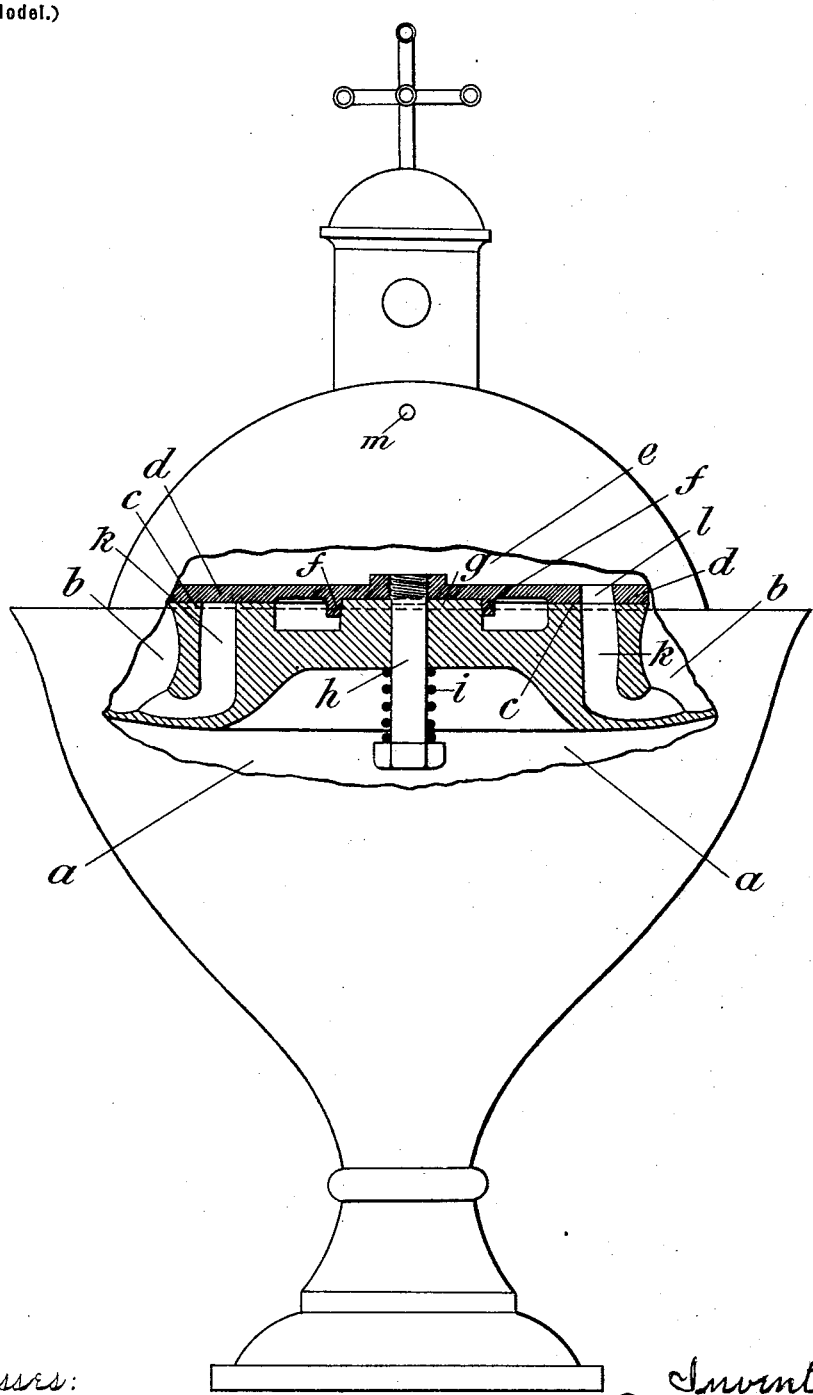

THÖGER CHRISTIAN THEODOR MÖLLER, OF COPENHAGEN, DENMARK.

CHALICE.

SPECIFICATION forming part of Letters Patent No. 685,785, dated November 5, 1901.

Application filed April 25, 1901. Serial No. 57,398. (No model.)

*To all whom it may concern:*

Be it known that I, THÖGER CHRISTIAN THEODOR MÖLLER, merchant, of No. 12 Pilestræde, Copenhagen, in the Kingdom of Denmark, have invented Improvements in Chalices, of which the following is a specification.

The present invention refers to a chalice, which is provided with a circle of cups, one for each communicant, which cups, the one after the other, may be filled from a suitable container placed above the cups by means of the pressure of the wine within the container. A constructional form of such a chalice is shown in the accompanying drawing, wherein the single figure is a view, partly in section and partly in elevation, representing an exterior form and interior construction.

$a$ is the chalice proper or the cup whose drinking-bowl $b$ is annular and by means of radially-arranged partitions is divided into a suitable number of sections, each of which may contain the proper quantity of wine for each communicant. In the middle of the chalice there is an annular plane surface $c$, upon which a corresponding annular plane surface $d$, forming the bottom of the wine-container $e$, may slide. This container is arranged so as to be capable of turning upon the chalice, it being provided with an annular collar $f$, fitting around a cylindrical part $g$ upon the chalice, and with a central pin $h$, projecting through a hole in the part $g$, which by means of a spiral spring $i$ keeps the container $e$ pressed against the chalice, so that the two plane surfaces $c$ and $d$ are pressed tightly against one another.

In the constructional form of chalice shown on the drawing each of the sections of the bowl $b$ is provided with a channel $k$, opening into the plane surface $c$. In the bottom plate $d$ of the container $e$ is arranged an opening $l$ in such a manner that this opening $l$ when the container is turned may be brought to correspond in succession with each of the channels $k$. The cavity of the container $e$, that is capable of holding a quantity of wine sufficient for filling all the sections of the bowl $b$ once, is by means of a hole $m$ in communication with the atmosphere and is provided with suitable devices for filling it, which, however, are not shown on the drawing.

The chalice is used in the following manner: The container is filled with wine and turned so that the opening $l$ is placed between two outlets of the channels $k$. The wine will then be prevented from flowing out into the drinking-bowl. By then turning the container until the opening $l$ is flush with one of the channels $k$ the wine will flow through this channel and fill the corresponding section of the bowl $b$. As soon as this section is full the container is again turned until the opening $l$ is just between the channel $k$ in question and the next one.

The shape of the chalice shown on the drawing is only by way of an example and may be altered in many ways without it being necessary to deviate from the principle of the invention.

Having now particularly described and ascertained the nature of the said invention and in what manner the same is to be performed, I declare that what I claim is—

A chalice consisting of a body portion having a series of cups, a wine-container located above said cups and provided with a rotatable bottom plate, and a support for receiving said bottom plate, the bottom plate having an opening, $l$, and the support having a series of openings, $k$, leading to the cups for the purpose of allowing the said cups to be filled as explained.

In testimony that I claim the foregoing as my invention I have signed my name in presence of two subscribing witnesses.

THÖGER CHRISTIAN THEODOR MÖLLER.

Witnesses:
 J. C. JACOBSEN,
 ERNEST BOUTARD.